United States Patent [19]

Martinez-Machin

[11] 4,205,421

[45] Jun. 3, 1980

[54] CLUTCH SPRING COMPRESSOR TOOL

[76] Inventor: Erotilde Martinez-Machin, 2985 NW. 95 St., Miami, Fla. 33147

[21] Appl. No.: 924,890

[22] Filed: Jul. 17, 1978

[51] Int. Cl.[2] .......... B23P 19/04

[52] U.S. Cl. .......... 29/256; 29/263

[58] Field of Search .......... 29/256, 217, 227, 263–265; 254/10.5

[56] References Cited

U.S. PATENT DOCUMENTS 1,389,657 9/1921 Harsley et al. .......... 29/227

FOREIGN PATENT DOCUMENTS 234229 5/1925 United Kingdom .......... 29/227

*Primary Examiner*—James L. Jones, Jr.

[57] ABSTRACT

A clutch spring compressor tool for use in removing an annular clutch piston from the interior of a tubular transmission housing by axially moving the clutch piston to compress circumferentially spaced axially extending springs, normally urging it into a first position away from that first position, to a second position, to create a space to gain access to remove a C-ring spring captivatingly securing the clutch piston within the tubular housing; wherein the tool is composed of a base sized to overlay one end of the transmission housing and it includes a fixed upstanding threaded shaft to extend into the tubular housing and through the clutch piston; and wherein it further includes a ring body movable along the shaft and the ring body has a pusher surface sized to overlay and register with a depressible keeper ring normally holding the clutch piston in the first axial position; and an operator threadably engaged on the shaft for applying axial pressure to the ring body to axially move it and thereby the keeper ring to the second position to compress the springs uniformly and simultaneously create sufficient axial space for access by a tool to remove the C-ring captivating the clutch piston within the transmission housing.

4 Claims, 5 Drawing Figures

CLUTCH SPRING COMPRESSOR TOOL

FIELD OF THE INVENTION

This invention relates to automobile repair tools and, more particularly, to a clutch spring compressor tool for disengaging a clutch piston from telescopic engagement within a tubular transmission housing.

BACKGROUND OF THE INVENTION

In the past there has often been a problem of removing a clutch piston of ring shape or annular form from within the axial passageway of a tubular transmission housing. This is because, conventionally, the clutch piston is captivated by means of a C-ring spring nested in a generally inaccessible annular recess in an annular sleeve within the housing. The cluth piston is normally urged by axially extending springs into a position which blocks access to the C-ring. A keeper ring holds a clutch piston yieldingly fixing it within the passageway of the tubular transmission housing. Such a problem is often encountered by mechanics working on transmissions to disengage the piston of low and reverse clutches of 25-350 Turbo-Hydramatic transmission types, Super Turbine 300 and Power Glide. This invention is of a tool to facilitate the difficult operation of repairing transmissions of vehicles with such transmission assemblies; and use of it facilitates access to remove the C-ring spring by a tool, for example, a pair of long nose pliers as shown in FIG. 5.

More specifically, the instant invention comprises a clutch spring compressor tool composed of a compression means in the form of a ring body which is axially movable to remove the C-ring spring or clip which holds an axially movable clutch piston keeper ring and for applying force to compress a plurality of circumferentially arranged axially spaced springs which urge the clutch piston into a predetermined axial position within the tubular housing. This tool is of use because it is often necessary to remove the clutch piston in a preferred type of transmission repair. Oftentimes such transmission housings are provided with a pressure installed axle and it is preferred that repairs take place without disturbing the original factory adjustment with an effect on the normal and efficient operation of the transmission assembly. This invention provides such a tool.

The tool operates in the following manner. The reverse clutch in transmissions of the type for which the tool is intended to be used are located at the rear inside, that is, at the bottom of the transmission, which makes it very difficult to disengage the clutch piston, which is composed of a piston, spring, cover and clip. With the tool, the clip or C-ring spring which holds the axially extending circumferentially spaced springs and keeper ring can be extracted without effort in a few seconds. After the transmission has been disassembled, when all other parts have been removed, the same is mounted over the compressor tool which has a round base upon which one end of the transmission housing rests and this base has a screw with a run-in thread affixed to the center of the base. The screw passes through the center of the transmission and on it a ring is provided. In order to avoid damage to the keeper ring, that is the cover of the circumferentially spaced axially extending springs, this apparatus is of a conical shape in the preferred embodiment. The apparatus exerts pressure against the keeper ring, that is the cover of the springs, by means of a butterfly nut placed on the run-in screw which passes directly through the center of the conical apparatus through an appropriate hole in its center. By advancing the nut pressure is applied which compresses the spring, forcing them down, thus leaving a space for access to remove the C-ring spring.

OBJECTS OF THE INVENTION

It is, accordingly, an object of this invention to provide a clutch spring compressor tool for use in disengaging a clutch piston from a tubular transmission housing which includes a base and an upstanding threaded shaft to extend within the passageway defined by the telescoped clutch piston captivated within the tubular housing and an axially movable compressor ring on the shaft and a threadably movable operator to engage the ring to advance and withdraw it to uniformly apply or release a circumferential force to axially move the clutch piston for gaining access to the clutch piston keeper C-ring captivating it within the tubular housing.

It is an object of this invention to provide a tool wherein the maneuverability of the compressor makes its use eassier and faster and requires a minimum effort, due to its small size, form the weight, which is an object of this invention.

A further object is that the tool is superior to those generally used because of its size, weight and ease of manupulation and a further object is to provide a device which is susceptible of being operated without a separate stand upon which it is to be mounted as it is adapted to be held with one hand and operated with another hand until the clip for C-ring spring is released.

It is a general object of this invention to provide an improved clutch spring compressor tool which is simple and inexpensive to manufacture, easy to operate, and which is particularly adapted for use with specific types of transmission assemblies and which is simple and inexpensive to manufacture and otherwise well adapted for the purposes which are set forth more fully hereinafter.

In accordance with these and other objects which will become apparent hereinafter, the instant invention will now be described with reference to the accompanying drawings, in which:

DESCRIPTION OF PREFERRED EMBODIMENT

Figure 1:
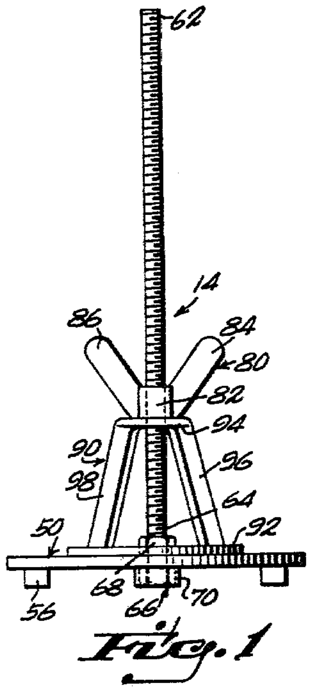
FIG. 1 is a side elevation view of the tool of the instant invention.
Figure 2:
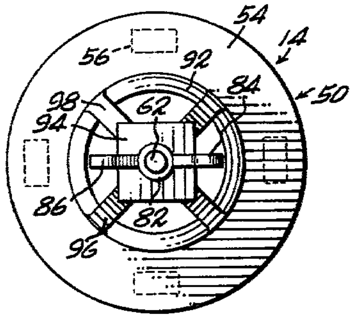
FIG. 2 is a top plan view of the tool in use for removing a clutch piston from a transmission housing.

Referring to the drawings wherein like reference characters designate like or corresponding parts throughout the several views, there is shown a transmission assembly generally designated by the numeral 12 and the tool generally designated by the numeral 14, the tool being shown more clearly in FIG. 1. The tool is for use in axially moving a clutch piston 33 which is normally in telescoping engagement within a tubular transmission housing 16.

More specifically, the transmission housing 16 includes a first or lower outer end surface 18 and a second or upper end zone 20 the latter internally recessed defining an axial through passageway 22. The housing is provided with a radially inwardly extending shoulder 24 with an axially extending annular ring portion 26. In the annularly extending ring portion 26 there is provided a circumferential recess 28 to nest a C-spring ring 30 sized to extend radially outwardly from the annular wall of the ring 28 into blocking engagement of a keeper ring 31 to restrain axial movement of it while in the recess 28.

Figure 3:
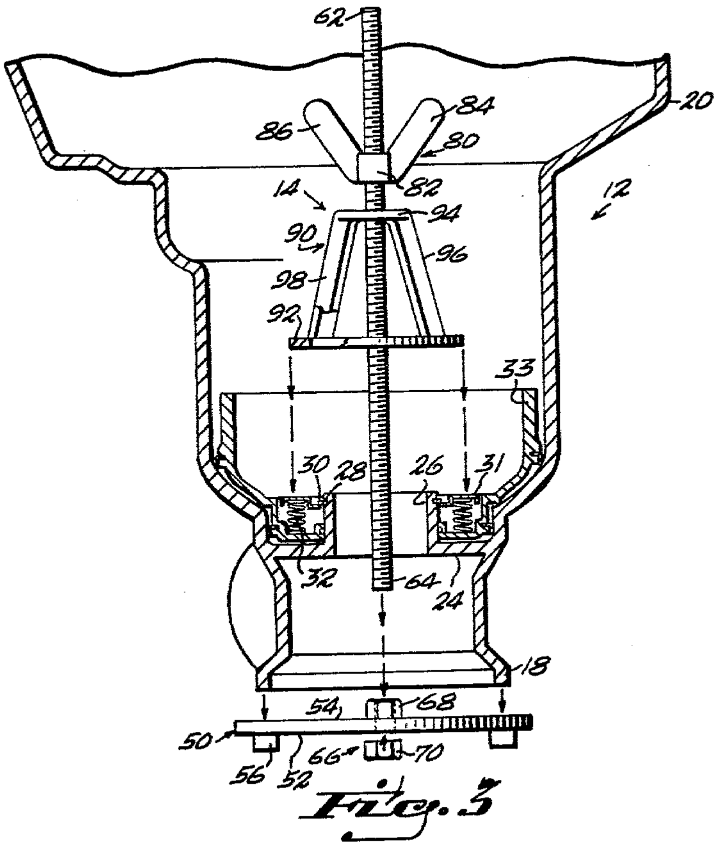
FIG. 3 is a side elevation view of the tool being inserted in a transmission housing for use in removing a clutch piston.
Figure 5:
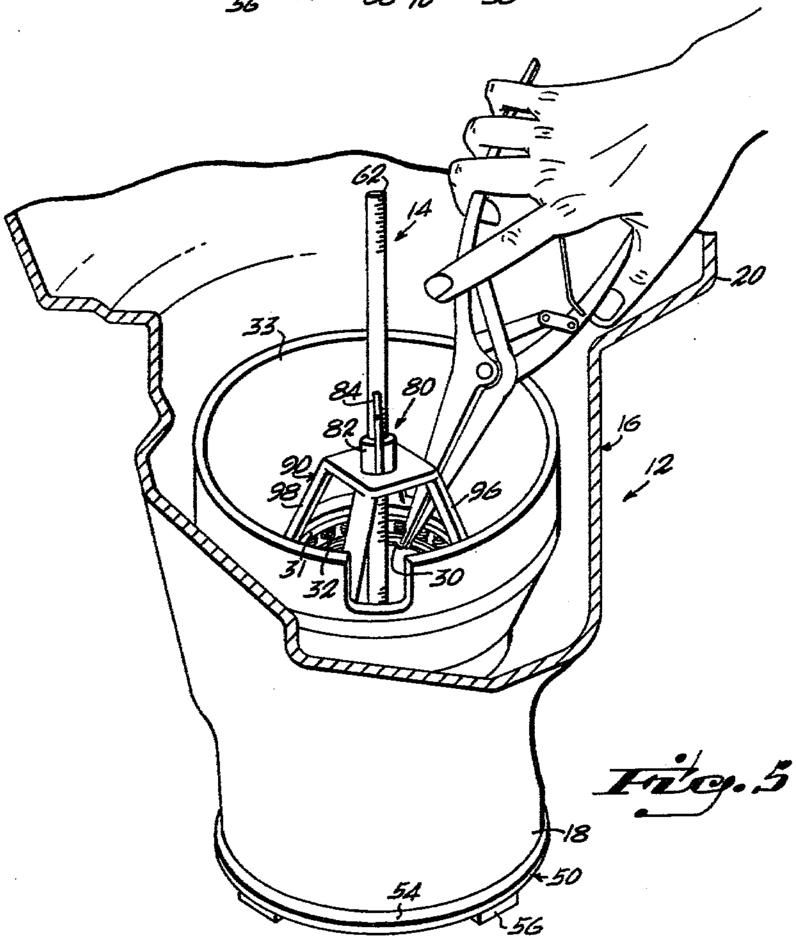
FIG. 5 is a perspective view which is partly broken away and illustrating a separate conventional tool for use in removing a C-ring captivating the clutch piston of a transmission in the transmission housing upon use of the instant invention.

In use, as can be seen from FIG. 3, it is difficult to gain access to the C-spring ring to remove it from blocking engagement of the keeper ring 31; however, this must be done in order to axially remove the clutch piston 33 from the housing. The tool of the instant invention is for use in compressing the keeper ring 31 by axially moving it toward the shoulder to compress the springs 32 which otherwise normally urge the keeper ring away from the shoulder, so that, as shown in FIG. 5, access space is created to accommodate a tool such as long nose pliers which may be utilized to grip the C-ring and remove it from the recess.

Figure 4:
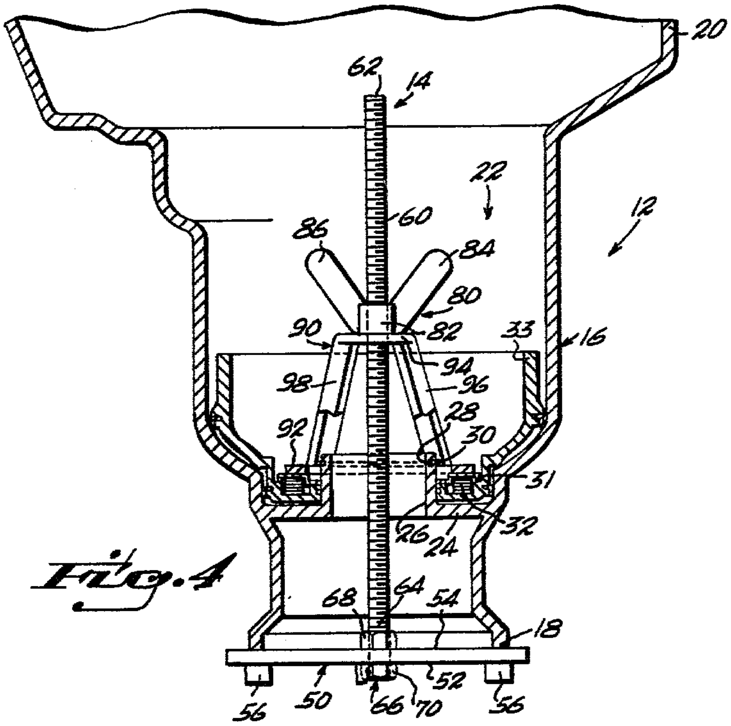
FIG. 4 is a view similar to FIG. 3 and illustrating the tool in position in a transmission housing for use in removing a clutch piston.

Referring now to the tool 14, shown in use in FIGS. 3 and 4 and more specifically in FIG. 1, it is seen that it includes a base 50 with an upstanding threaded shaft 60, a compression ring 90 axially movable along the shaft and an operator 80 in the form of a nut for threaded advancement of the ring 90 along the shaft.

More specifically, with respect to the tool of FIG. 1, it includes the base 50 with a lower or outer axial face 52 and an upper or support face 54, the latter being sized to overlay and close the end 18 of the housing of the transmission. Preferably, the base is provided with feet, such as 56 which extend away from the base surface 52 to provide a support surface.

From the central zone of the surface 54 of the base there extends upwardly the aforementioned shaft 60 which is sized for passage through the longitudinally extending passageway 22, i.e., through the housing and clutch piston; and it is of a length sufficient to extend from the lower end 18 of the housing substantially beyond the shoulder 24 within the housing and above the C-ring recess toward the second end zone 20 of the transmission housing. Suitable means 66 are provided to fix the rod or shaft 60 to the base, which may be in the form of a pair of nuts 66 and 70 clampingly engaging the plate therebetween on the lower end zone 68 of the shaft. The shaft is threaded between the lower end zone and the upper end 62.

A clutch plate compression means 90 is provided and in the preferred embodiment it comprises a ring body with a lower annular ring 92 sized to confrontingly engage the surface of the keeper ring 31 and an axially spaced upper bearing surface 94 which extends radially outwardly of the surface of the shaft 60, there being a through opening for axial movement of the ring body along the shaft. In the preferred embodiment of the ring body is generally conical so that the upper bearing surface 94 is spaced axially from the clutch piston engaging surface or ring 92; and the body is of openwork construction including force transmitting legs circumferentially spaced from one another, as indicated by the numerals 96 and 98.

An operator 80 is provided for threaded axial movement along the shaft 60; and preferably it is provided with radially outwardly extending wings or arms 84 and 86, which preferably extend toward the upper end 62 of the shaft and provide torque applying surfaces for manipulation of the operator 80 to advance the nut portion 82 threadably along the shaft toward the lower end zone 64.

In use, as shown in FIG. 3, the ring is positioned over the shaft and centered in mating engagement on the keeper ring after the shaft has been secured to the base and positioned so as to extend longitudinally through the passageway 22. Thereafter, the operator 80 is threadably advanced until the nut portion 82 engages the upper bearing surface portion 94 to axially move the compression means or ring body to uniformly and simultaneously compress the springs 32 circumferentially arranged about the keeper ring. Upon compression of the springs, as shown in FIG. 5, the C-ring may be removed as shown in FIG. 5 and the tool withdrawn by turning the operator in the opposite direction to threadably withdraw it whereupon access can be had to the springs and the clutch piston may be removed.

What is claimed is:

1. A clutch spring compressor tool for use in disengaging a clutch piston with an axial opening which is telescopically captivated in a tubular housing of a conventional transmission wherein the housing defines an axial passageway having a first outer end surface about the axial passageway and a second end which is inwardly recessed and wherein a housing shoulder is provided in the passageway between the ends and is sized for abutting mating engagement with the clutch piston and wherein the shoulder includes an annular axially extending portion with a C-ring recess in spaced relation from the shoulder and a C-spring ring is normally in the C-ring recess with a portion in blocking engagement of telescopic removal of the clutch piston from the passageway and wherein a plurality of circumferentially spaced rings of common size are captivated between the clutch piston and the shoulder normally urging the piston away from the shoulder and into abutting engagement with the C-spring ring, said tool comprising, a base having a first main axial face with a central zone and a second opposite face, said first base surface being sized to overlay the first end of the transmission housing, an elongate exteriorly threaded shaft having an upper end and a lower end zone, said shaft being of a length greater than the axial distance between the first end of the transmission housing and the shoulder to extend a predetermined axial length from the shoulder and a substantial distance from the central zone of the base when said first main axial face is in confronting engagement with the first end of the housing, means connecting the lower end zone of the shaft in use in upstanding relation to the base and extending away from the central zone of the first face of said base, a clutch piston compression structure to axially move the clutch piston in the passageway toward the shoulder at all times in symmetrical relation with respect to the axial passageway, said clutch piston compression structure comprising a body having a first annular axially facing surface of a first predetermined diameter and sized to register in overlaying relation on the clutch piston in the recessed second end of the transmission and said body having an axial through opening sized for passage along the shaft and including a radially extending bearing surface axially spaced from the first annular axially facing surface; and said bearing surface being of a second predetermined diameter which is less than said first predetermined diameter, and spaced axially converging struts rigidly connecting said bearing surface and said first surface defining a generally open work frustoconical compression structure of a height less than said predetermined axial length from said shoulder;

a threaded member on the shaft including radially outwardly extending turn knobs to facilitate axial movement of the threaded member on the shaft toward and away from the base, said threaded member being sized to confrontingly engage said bearing surface for threadably advancing and withdrawing the body axially to move the clutch piston toward the shoulder to simultaneously compress the circumferentially spaced rings and the space between said struts providing for access to the C-ring by a separate tool.

2. The device as set forth in claim 1 wherein said base includes an axially outwardly facing tool support surface.

3. The device as set forth in claim 2 wherein said support surface includes axially extending feet.

4. The device as set forth in claim 1 wherein said radially extending turn knobs comprise outwardly extending arms said arms outwardly diverging with respect to one another.

* * * * *